United States Patent Office 3,291,762
Patented Dec. 13, 1966

3,291,762
METHOD OF PREPARING A PLASTERING MATERIAL FROM FLAKES OF A FOAMED THERMOPLASTIC POLYMER
Russell J. Raymond, Midland, Mich., assignor to The Dow Chemical Company, Midland, Mich., a corporation of Delaware
No Drawing. Filed Jan. 3, 1963, Ser. No. 249,137
5 Claims. (Cl. 260—2.5)

This invention concerns a method of preparing a material for plastering masonry surfaces. More precisely it relates to a method for uniformly coating particles of an inert filler with a polymeric cementing material for use in plastering surfaces.

Cracks and seams in masonry structures are sometimes caulked with a grouting materials to prevent the passage of air and water through them. In other instances surfaces may be plastered for the purpose of presenting a smooth finish or a more attractive surface. Polymeric or organic materials which harden and adhere well to the surfaces are sometimes used as the caulking or plastering material. Diluents or fillers such as sawdust, clay, sand, and the like are commonly added to the polymeric material to reduce the amount of the material which is required, thereby lowering the cost of the plastering material. These fillers are also beneficial in reducing shrinkage and cracking of the polymer as the solvent evaporates. The amount of diluent or filler which can be mixed with the polymer is limited by the difficulty of mixing the filler with the viscous polymer. The ease with which the mixing can be carried out may be increased by diluting the polymer with a solvent, however, this is an expensive expedient and is not desirable. In addition to the added cost of solvent, the plastering material is more difficult to use owing to its low gel strength which permits the filler particles to settle in the plastic solution.

I have discovered a method of preparing a plastering material having a high proportion of inert filler to polymeric cementing agent which requires neither large volumes of solvent nor mixing equipment suitable for highly viscous materials.

It is therefore an object of my invention to provide a method of preparing a plastering material comprising a polymeric cementing agent and an inert filler.

A more specific object is to provide a method whereby plastering materials having high concentrations of filler are prepared without the use of large volumes of solvent.

A further object is to facilitate the mixing of inert solid particles with partially-solubilized polymeric cementing materials.

It is also an object to produce a plastering material which adheres well to porous or masonry surfaces in the presence of dirt, grit and other solid particles as well as oil, grease and similar surface contaminants.

Another object is to produce an air-drying plaster containing a minimum of solvent for the cementing material so that its use does not produce a hazardous atmosphere.

An additional object is to provide a method of mixing a plastic cementing material with a filler without the use of mixing equipment adapted for high viscosity materials.

These and other objects are accomplished by the method of my invention. Briefly described, what I have discovered is that plastering materials containing up to 97 weight percent solid filler material can be prepared easily by blending particles of a foamed thermoplastic polymer with the dry inert filler material, then adding a small quantity of a solvent for the foamed plastic while continuing to blend the mixture. The plastic particles, which may be in the form of beads, flakes, or the like are placed in a mixer along with a filler such as sand or sawdust and blended briefly to produce a free-flowing mixture of the materials. Thereafter a small amount of a solvent for the plastic is added to the mixture while mixing is continued. The quantity of solvent should be an amount sufficient to wet the plastic and filler without producing a separate liquid phase. The solvent swells and dissolves the polymer molecules so that they attach to the particles of filler adjacent the polymer particle. Mixing is continued briefly until the particles of filler are substantially completely wetted by the plastic. In this manner the filler is easily blended with the polymer before the mixture becomes viscous and difficult to mix. The foamed plastic is particularly unique in this method of preparing a plastering material. The thin, extended surface of the foam absorb the solvent, rapidly producing a tacky adhesive which produces an interconnecting web between the filler particles. Also, solvent which wets the filler particles promotes the adhesion of the particles to the foam. Thus the bulk of the heterogeneous mixture soon develops a composite mass of plastering material with all filler particles coated with a thin adhesive film of plastic.

Plastering material prepared in this manner may be troweled on flat surfaces or packed into cracks, holes, or the like. Thereafter the solvent evaporates, leaving a firm plastic web cementing the filler particles together and to the surface covered by the plaster. Surface preparation is greatly simplified when using this composition for plastering surfaces. Small particles of dust, grit, and other solids on the surface to be plastered will be bonded to the surface by the plastic cementing material. Also, oil and grease films need not be removed prior to plastering since the solvent enables the cementing material to penetrate such films.

A number of foamed plastics are commercially available which are suitable for use according to my invention. Polystyrene, polyvinylchloride and numerous copolymers such as those of styrene and acrylonitrile or methyl methacrylate may be used. As mentioned previously the foamed plastic may be in the form of flakes, beads or pellets. A particularly suitable material is prepared by chopping or shredding foamed polystyrene to the desired particle size. The minimum size of the particles is limited primarily by the degree of size reduction which is practical for the particular plastic and shredding equipment. The maximum particle dimension is the only dimension which appears to affect the method of my invention. In general, marble-sized pellets having a diameter of about ½ inch are the maximum size which can be used without occasional difficulty. Shredded or comminuted plastic in the form of flakes, strips or the like having a particle volume of plastic foam near that of the ½ inch pellets may be used. Larger particles, particularly those in the shape of beads and pellets, do not mix with the filler so readily owing to the tendency of the foamed structure to collapse in the presence of the solvent without contacting the proper volume of filler. This tendency can be overcome to some extent by using slower acting solvents.

Numerous materials may be used as the filler in this plastering material. The filler should be a material which is inert in the environment of its cementing plastic and solvent as well as those materials likely to contact the plaster in the future. Suitable fillers include sand, sawdust, polymer granules, glass or metal particles, and insoluble foams. A filler such as clay having small particles is less desirable owing to the high proportion of plastic to filler which is necessary to cement the large surface area of the particles. On the other hand large filler particles usually do not produce plastering materials having adequate compressive strength unless the plaster has a high ratio of plaster to filler. For these reasons the filler material should contain particles having at least 95 weight percent which pass a 4 mesh sieve and are retained on a 200 mesh sieve of the U.S. Standard Sieve Series, and preferably particles in the range from 12 mesh to 100 mesh. Mason's sand, which has the clay fines and gravel removed, is particularly suitable. In some instances it may be desirable to add fibrous materials such as glass or asbestos fibers to increase the tensile strength of the plaster. These materials have been found to mix well with the filler and foamed plastic using the method of my invention.

Numerous solvents are available for the various foamed plastics which may be used in practicing my invention. The most common solvents for those plastics include toluene, acetone, perchloroethylene, benzene, ethyl chloride and other halogenated solvents. In addition to the solvent power of a particular solvent or blend of solvents, the boiling point or volatility is usually important. It is desirable to employ one which does not evaporate too readily under the conditions of use. Thus, acetone may be a satisfactory solvent for a plastering material to be applied to a cold surface, whereas toluene would be preferred where the surface is warm as in the case of an outside wall in summer sun.

The amount of solvent required varies somewhat with the exposed surface area of the filler. A rounded, dense sand usually has little internal pore space and requires less solvent than fillers such as fly ash and dry sawdust that have extensive capillary structures and which adsorb a substantial volume of solvent. A higher ratio of solvent to plastic will be required for a filler such as sawdust than for sand. From about one to five, and preferably 1.5 to 3.5 parts by weight of solvent, to each part of foamed plastic are suitable for plasters containing a sand filler. Porous fillers such as sawdust may require up to 10 parts by weight of solvent to each part of foamed plastic. The preferred amount of solvent dissolves the smaller polymer molecules and swells the larger molecules without presenting a separate liquid phase of solvent in the mixture.

Plastering materials used in grouting floors or other structures subjected to compressive stresses only are extremely durable even though they have low physical strength. When high strength is desired as in the case of grouting and caulking material for masonry structures which are likely to undergo both tensile and compressive stresses, additional strength may be obtained by incorporating a hardening agent such as damar gum, linseed oil, tung oil, or the like. The development of final strength in the plaster is delayed when additives of this type are present. These agents may be dissolved in the solvent and added to the mixture in that manner.

Plastering materials containing at least 3 weight percent plastic and no more than 97 weight percent filler can be prepared using the method of my invention. Lower concentrations of plastic may result in a material containing some uncemented filler. The maximum utility of this invention is in the preparation of these highly filled plastering materials although it may also be used in the preparation of plasters having low concentrations of filler.

The color of the plastering material may be made to blend with the surface to which it is to be applied by using either a colored plastic foam or a colored filler, or a combination of colored materials. Decorative surfaces such as wall murals can be made from an assortment of colored plastering materials.

In addition to the use of this novel method in preparing plastering materials, it may also be used in preparing roofing compounds, sand stabilization and foundry core preparation. It may also be used to mix plastering materials for coating pipes and vessels operating in corrosive environments.

A number of mixtures were prepared to evaluate this method of makinng plastering and grouting materials. The following examples are illustrative of, but are not to be construed as limiting, the invention. The parts of the ingredients are by weight.

*Example I*

Flakes of foamed polystyrene having a thickness of approximately 1/16 inch and a diameter between about 1/4 and 1/2 inch were mixer with mason's sand. One part of polystyrene and 9 parts of sand were placed in a cup and mixed by stirring the dry mixture. Two parts of acetone were than added and the stirring continued for a short time. The acetone rapidly dissolved and swelled the plastic so that the grains of sand were joined together by the adhesive plastic. The stirring becomes more difficult as the plastic swells and is discontinued shortly after the mixture reaches this stage. This material was packed into holes which had been used for anchor bolts in a concrete floor. The holes were cleared of debris but were not washed before filling with the mixture. The filling remained intact after more than a year of moderate pedestrian traffic.

*Example II*

A blend containing one part of flaked polystyrene foam and 9 parts of mason's sand was stirred while 1½ parts of benzene were added. This plastering material had a consistency similar to that of Example I. A layer of this plastering material was spread on a block of urethane foam and allowed to dry. When the plaster had solidified, it was found that the layer was bonded firmly to the urethane foam.

*Example III*

A foamed copolymer of about 70 percent styrene and about 30 percent acrylonitrile in the form of small particles was blended with mason's sand in the ratio of one part copolymer to 9 parts sand, then was mixed with 2 parts of acetone. After drying, this material exhabited good bonding strength and resistance to abrasion.

*Example IV*

A plastering material was prepared from one part polystyrene foam and 9 parts sand, using carbon tetrachloride as the solvent, then was used to coat a block of styrene-acrylonitrile copolymer foam of the type used in Example III. The plastering material dried to a tough, well-bonded coating on the foam block.

*Example V*

A foamed copolymer containing about 65 percent methyl methacrylate and 35 percent styrene was mixed with sand in the ratio of one part copolymer to 9 parts sand, then was stirred with 2 parts of ethyl chloride to dissolve and swell the polymer. When dried, the sand grains were found to be well-bonded in the matrix.

*Example VI*

One part of polystyrene foam was blended with 9 parts of sand. One-tenth part of tung oil was dissolved in 2 parts of acetone then stirred into the foam-sand blend. This mixture dried to a tougher mass than that of Example I, which did not contain tung oil.

Samples of plastering materials prepared by several of the above procedures have been applied to concrete walls exposed to normal weathering conditions including rain, sunshine and subfreezing temperatures for a period of more than a year without undergoing noticeable deterioration.

I claim:

1. A method of preparing a plastering material comprising:

blending together flakes of a foamed thermoplastic polymer with up to 97 percent by weight of a dry filler, dissolving minor proportion of a drying oil in a major proportion of a solvent for said polymer, then stirring into said blend of thermoplastic polymer and filler a quantity of said solution of drying oil which wets said blend without forming a separate phase.

2. The method of claim 1 wherein said filler has a particle size such that at least 95 weight percent passes a 12 mesh sieve and is detained on a 100 mesh sieve of the U.S. Standard Sieve Series.

3. The method of claim 1 wherein said filler is sand, the concentration of said sand in said plastering material being less than about 97 weight percent.

4. The method of claim 1 wherein said thermoplastic polymer consists of flakes of foamed polystyrene having a maximum particle volume approximately equal to that of a sphere one-half inch in diameter.

5. A method according to claim 1 wherein the polymer is polystyrene and the drying oil is tung oil.

References Cited by the Examiner
UNITED STATES PATENTS

| | | | |
|---|---|---|---|
| 2,768,563 | 10/1930 | Immerman | 260—41 |
| 3,021,291 | 2/1962 | Thiessen | 260—2.5 |

MURRAY TILLMAN, *Primary Examiner.*

N. F. OBLON, *Assistant Examiner.*